United States Patent
Dolenti et al.

(10) Patent No.: US 8,857,464 B2
(45) Date of Patent: Oct. 14, 2014

(54) VALVE ACTUATORS HAVING MAGNETIC ANGLE SENSORS

(75) Inventors: William T. Dolenti, Lynchburg, VA (US); Byron A. Fleury, Lynchburg, VA (US)

(73) Assignee: Flowserve Management Company, Irving, TX (US)

( * ) Notice: Subject to any disclaimer, the term of this patent is extended or adjusted under 35 U.S.C. 154(b) by 693 days.

(21) Appl. No.: 12/022,992

(22) Filed: Jan. 30, 2008

(65) Prior Publication Data

US 2009/0189110 A1    Jul. 30, 2009

(51) Int. Cl.
*F17D 3/00* (2006.01)
*G01D 5/14* (2006.01)
*G01D 5/04* (2006.01)
*F02D 11/10* (2006.01)
*F02D 41/00* (2006.01)

(52) U.S. Cl.
CPC ........ *G01D 5/145* (2013.01); *F02D 2200/0404* (2013.01); *F02D 41/0002* (2013.01); *G01D 5/04* (2013.01); *F02D 11/106* (2013.01)
USPC ................... 137/554; 324/207.2; 324/207.21; 324/207.22; 324/207.25; 251/129.11

(58) Field of Classification Search
USPC ........ 251/129.01, 129.11; 324/207.2, 207.21, 324/207.22, 207.25; 137/554; 123/337
See application file for complete search history.

(56) References Cited

U.S. PATENT DOCUMENTS

| | | | | |
|---|---|---|---|---|
| 6,433,539 B2 * | 8/2002 | Gaessler et al. | ......... | 324/207.25 |
| 6,435,169 B1 * | 8/2002 | Vogt | .......................... | 123/568.23 |
| 6,445,178 B1 * | 9/2002 | Hoekstra | .................. | 324/207.12 |
| 6,448,762 B1 * | 9/2002 | Kono et al. | ................ | 324/207.2 |
| 6,486,659 B1 * | 11/2002 | Schroeder | ................ | 324/207.21 |
| 6,542,088 B1 * | 4/2003 | Bielski et al. | .................... | 341/15 |
| 6,545,462 B2 * | 4/2003 | Schott et al. | ................ | 324/207.2 |
| 6,593,732 B2 * | 7/2003 | Dammkohler et al. | .. | 324/207.21 |
| 6,703,827 B1 * | 3/2004 | Wolf et al. | ............... | 324/207.12 |
| 6,894,487 B2 * | 5/2005 | Kunz-Vizenetz | ........ | 324/207.25 |
| 6,930,477 B1 * | 8/2005 | Kurita et al. | ............. | 324/207.25 |
| 6,955,335 B2 * | 10/2005 | Kawai et al. | ............. | 251/129.11 |
| 6,958,600 B1 * | 10/2005 | Affaticati et al. | ........ | 324/207.25 |
| 6,992,478 B2 * | 1/2006 | Etherington et al. | ...... | 324/207.2 |
| 7,032,617 B2 * | 4/2006 | Kurita et al. | .................. | 137/554 |

(Continued)

FOREIGN PATENT DOCUMENTS

EP         1061341        12/2000
WO    WO2006099726       9/2006

OTHER PUBLICATIONS

International Search Report for PCT/US2009/032707, dated Apr. 14, 2009, 2 pages.

(Continued)

*Primary Examiner* — John K Fristoe, Jr.
*Assistant Examiner* — Marina Tietjen
(74) *Attorney, Agent, or Firm* — TraskBritt, P.C.

(57) ABSTRACT

A valve actuator including a magnetic angle sensor is disclosed. The magnetic angle sensor may function as an absolute position encoder. The magnetic angle sensor may also function as an incremental position encoder. The magnetic angle sensor may generate angular velocity data. The magnetic angle sensor may be used in quarter-turn and single-turn rotary valve actuators. The magnetic angle sensor may also be used in multi-turn rotary and linear valve actuators.

15 Claims, 2 Drawing Sheets

(56) References Cited

U.S. PATENT DOCUMENTS

| | | | |
|---|---|---|---|
| 7,088,096 B2* | 8/2006 | Etherington et al. | 324/207.24 |
| 7,193,411 B2* | 3/2007 | Sudo et al. | 324/207.21 |
| 7,265,540 B2* | 9/2007 | Sudo et al. | 324/207.21 |
| 7,304,473 B2* | 12/2007 | Kuroyanagi et al. | 324/207.25 |
| 7,307,416 B2* | 12/2007 | Islam et al. | 324/207.25 |
| 7,378,841 B2* | 5/2008 | Kurita et al. | 324/207.25 |
| 7,405,560 B2* | 7/2008 | Shimizu et al. | 324/252 |
| 7,466,125 B2* | 12/2008 | Heinze et al. | 324/207.25 |
| 7,474,090 B2* | 1/2009 | Islam et al. | 324/207.25 |
| 7,671,584 B2* | 3/2010 | Uryu et al. | 324/207.25 |
| 7,808,196 B2* | 10/2010 | Hartmann et al. | 318/443 |
| 7,852,070 B2* | 12/2010 | Yamada et al. | 324/207.25 |
| 8,022,796 B2* | 9/2011 | Deininger et al. | 335/205 |
| 8,111,064 B2* | 2/2012 | Wagner et al. | 324/207.25 |
| 8,138,751 B2* | 3/2012 | Edwards | 324/207.25 |
| 8,170,757 B2* | 5/2012 | Furhoff et al. | 701/51 |
| 8,294,457 B2* | 10/2012 | Schrubbe et al. | 324/207.25 |
| 8,334,688 B2* | 12/2012 | Quinn | 324/207.2 |
| 2001/0033160 A1 | 10/2001 | Glasson | |
| 2003/0001565 A1* | 1/2003 | Hoekstra | 324/207.21 |
| 2003/0020465 A1* | 1/2003 | Wolf | 324/207.2 |
| 2003/0086470 A1 | 5/2003 | Nomiyama et al. | |
| 2004/0046547 A1* | 3/2004 | Landrieve | 324/207.2 |
| 2004/0070392 A1* | 4/2004 | Hahn | 324/207.22 |
| 2004/0129909 A1* | 7/2004 | Wiese | 251/129.04 |
| 2005/0028871 A1 | 2/2005 | Kurita et al. | |
| 2005/0062003 A1 | 3/2005 | Kim et al. | |
| 2005/0080527 A1* | 4/2005 | Tao et al. | 701/34 |
| 2005/0092367 A1 | 5/2005 | Espinoza | |
| 2005/0109314 A1* | 5/2005 | Suzuki et al. | 123/337 |
| 2005/0183695 A1* | 8/2005 | Keefover et al. | 123/399 |
| 2005/0184727 A1* | 8/2005 | Kurita et al. | 324/207.21 |
| 2006/0087316 A1* | 4/2006 | Islam et al. | 324/207.25 |
| 2006/0119353 A1 | 6/2006 | Nakano et al. | |
| 2007/0090829 A1* | 4/2007 | Kurita et al. | 324/207.25 |
| 2007/0151322 A1* | 7/2007 | Steinich | 73/1.75 |
| 2008/0012522 A1* | 1/2008 | Wiegers et al. | 318/638 |
| 2010/0050731 A1* | 3/2010 | Granig et al. | 73/1.11 |
| 2011/0080162 A1* | 4/2011 | Steinich et al. | 324/207.25 |
| 2012/0176070 A1* | 7/2012 | Wallrafen | 318/400.04 |
| 2013/0063137 A1* | 3/2013 | Ikeda et al. | 324/207.25 |

OTHER PUBLICATIONS

Written Opinion for International PCT Application No. PCT/US2009/032707, mailed Apr. 14, 2009.

International Preliminary Report on Patentability for International PCT Application No. PCT/US2009/032707, dated Aug. 3, 2010.

RLS Rotary and Linear Motion Sensors, 13 BIT Angular Magnetic Encoder, www.rls.si, 2005, 6 pages.

RLS Rotary and Linear Motion Sensors, Angular Magnetic Encoder IC, www.rls.si, 2005, 20 pages.

RLS Rotary and Linear Motion Sensors, AM8192, 13 BIT Angular Magnetic Encoder, www.rls.si, 2006, 3 pages.

European Extended Search Report for corresponding EP Application No. 09706689.8, dated Dec. 14, 2011, 7 pages.

* cited by examiner

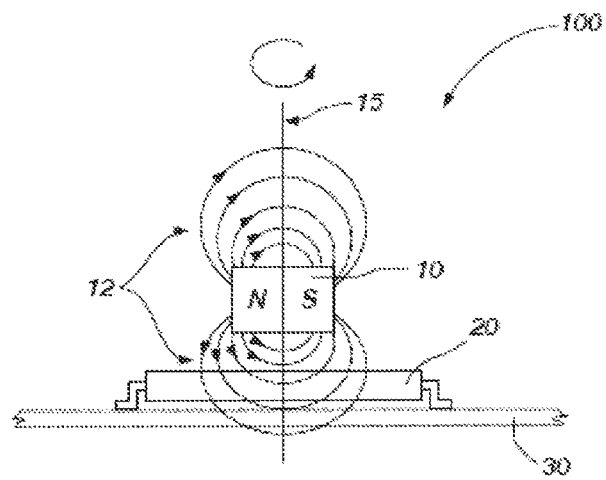
FIG. 1
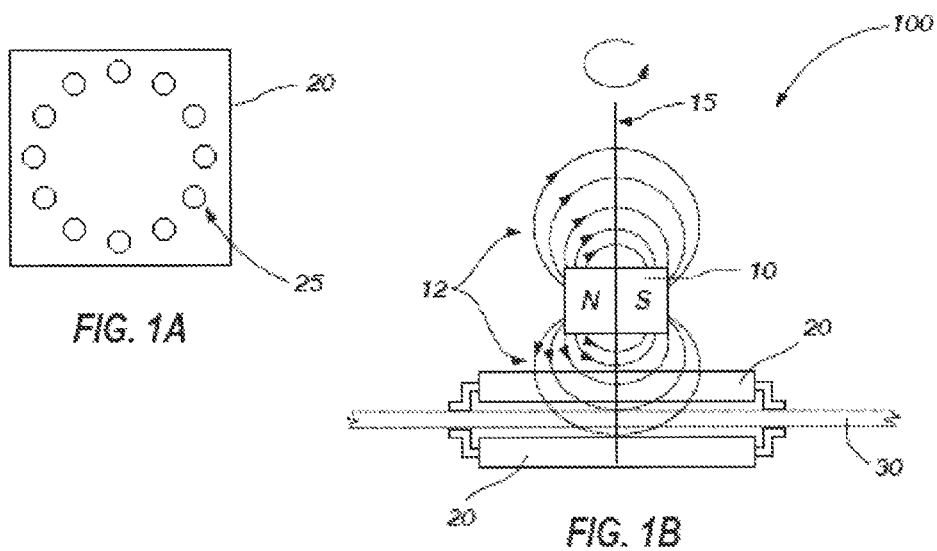
FIG. 1A
FIG. 1B
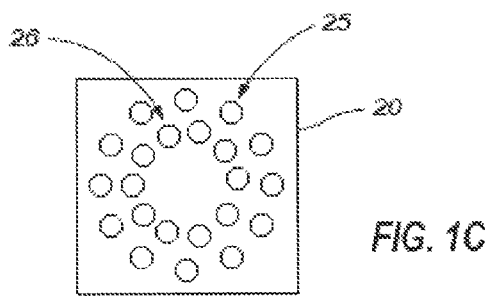
FIG. 1C

US 8,857,464 B2

VALVE ACTUATORS HAVING MAGNETIC ANGLE SENSORS

FIELD OF THE INVENTION

Embodiments of the present invention relate generally to valve actuators and, more specifically, to valve actuators having magnetic angle sensors, methods of using magnetic angle sensors, and systems including magnetic angle sensors.

BACKGROUND OF THE INVENTION

Valve actuators are used to operate valves and are manufactured in numerous shapes, sizes, forms, and have a wide variety of utilities. It is common for an operator of a valve actuator to want to know the specific position of a valve. Absolute encoders and incremental encoders have been utilized with valve actuators to determine the position of a valve. The encoders monitor the position of the valve actuator to determine the corresponding position of a valve.

Absolute encoders utilize a unique signature for each position of a valve actuator. Absolute encoders often use either a single disc or multiple discs that are rotated as a valve actuator moves to different positions. The single or multiple discs of an absolute encoder have markings, different combinations of which provide a unique signature for each position of a valve actuator. This unique signature is analyzed at any time to determine the position of the valve actuator.

Incremental encoders, on the other hand, do not have a unique signature for each position of the valve actuator. Instead, incremental encoders monitor changes in the valve actuator relative to an arbitrary starting point, such as the fully closed position of a valve. An incremental encoder, also referred to as a relative encoder, is often a single disc with a series of duplicate markings around the edge of the disc. As the disc is rotated, each time one of the marks passes a point, a change in position is recorded. As long as the marks are recorded in the memory of a computer, then the valve actuator position is known.

Absolute encoders have the benefit that if power is lost, position information is not lost as well. When power is restored, the unique signature is analyzed to determine position information. If the computer memory of an incremental encoder loses power, then position information is lost. However, absolute encoders are more susceptible to damage, wear, and misalignment than incremental encoders.

BRIEF SUMMARY OF THE INVENTION

One exemplary embodiment of the present invention relates to a valve actuator including at least one rotatable member and a magnetic angle sensor configured for use with the at least one rotatable member.

Another exemplary embodiment of the present invention relates to a method of determining the position of a valve actuator. The method includes correlating an electrical output of a magnetic angle sensor installed in the valve actuator with a position of an output shaft of the valve actuator. The sensor is energized to generate electrical output from the sensor. The position of the output shaft is determined from the electrical output of the sensor.

A further exemplary embodiment of the present invention relates to a valve system. The valve system includes a valve and a valve actuator operably coupled to the valve. The valve actuator includes at least one rotatable member and a magnetic angle sensor operably coupled to the at least one rotatable member.

BRIEF DESCRIPTION OF THE SEVERAL VIEWS OF THE DRAWINGS

While the specification concludes with claims particularly pointing out and distinctly claiming that which is regarded as the present invention, the embodiments of this invention can be more readily ascertained from the following description of the invention when read in conjunction with the accompanying drawings in which:

FIG. 1 illustrates an embodiment of a magnetic angle sensor;

FIG. 1A illustrates an alternative embodiment of a magnetic angle sensor;

FIG. 1B illustrates an another alternative embodiment of a magnetic angle sensor;

FIG. 1C illustrates an additional embodiment of a magnetic angle sensor;

DETAILED DESCRIPTION OF THE INVENTION

Figure 2:
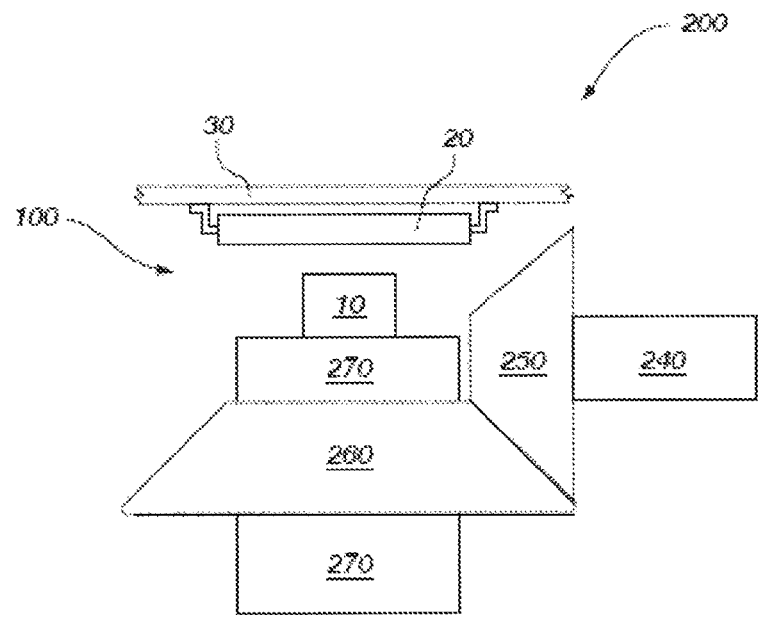
FIG. 2 illustrates an embodiment of a valve actuator including an embodiment of a magnetic angle sensor.

Embodiments of the present invention relate generally to valve actuators. More specifically embodiments of the present invention relate to valve actuators having magnetic angle sensors, methods of using magnetic angle sensors, and systems including magnetic angle sensors.

Reference will now be made to the drawings. The drawings are not necessarily to scale.

FIG. 1 illustrates an exemplary representation of a magnetic angle sensor 100. Magnetic angle sensor 100 may be any magnetic angle sensor known in the art. Magnetic angle sensor 100 may include magnet 10, circuit 20, and printed circuit board 30 (PCB 30) Magnet 10 may be a to-pole cylindrical magnet. Magnet 10 may actually not contact circuit 20. Magnet 10 may be integrated into a single package with circuit 20 or alternatively, magnet 10 may be external to any packaging of circuit 20. Circuit 20 may be mounted on PCB 30 by conventional methods. PCB 30 may also be optional. Other components conventionally included with magnetic angle sensors may be included with magnetic angle sensor 100.

Magnet 10 generates magnetic fields 12 and may rotate around axis 15. Circuit 20 may be used to monitor magnetic fields 12 and determine the rotational position of magnet 10 based upon the position of magnetic fields 12.

Circuit (sensor chip) 20 may include an array 25 of Hall sensors (FIG. 1A), which face the radial direction of the magnetic field in its horizontal plane. The magnet 10 is arranged such that its North/South axis is parallel to the horizontal plane of the sensor. The sensor compares the angle of the applied field to an internal reference angle and digitally reports the angular difference over 360 degrees. The magnetic field angle sensor chip is in fact a set of tiny Hall sensors, radially arrayed such that the relative strength of the signals from each sensor can be analyzed by the electronics in the circuit 20 to determine the direction and magnitude of the magnetic field in which it is immersed. In typical operation, a Hall sensor that is in line with the field will have the largest signal. A Hall sensor that is perpendicular to the field will have the lowest signal. Knowing the physical angle for the placement of each Hall sensor allows one to determine the angle of the magnetic field. For low resolution results, one could simply determine which sensor is providing the strongest signal and report the physical angular position for that sensor as the angle of the magnetic field. In a particular embodiment, for better precision, on may vectorially sum the signals from all of the sensors, which allows the direction of the field to be interpolated to values that lie between the actual physical placements of the sensors. When the field strength is above a given threshold level, the reported angle will not substantially vary with field strength, since it is only sensitive to the relative angle of the applied field. In additional embodiments, magnetic field 12 may cause a voltage, called the Hall voltage, into each of the sensors of circuit 20. Thus, the position of magnet 10 may be absolutely identified by circuit 20. A valve actuator, as will be discussed below, may in turn rotate magnet 10. Therefore, the position of magnet 10 may be used to identify the position of the valve actuator.

Circuit 20 may include a magneto-resistive sensor. In this embodiment, circuit 20 may measure an electrical resistance effect. The angles of magnetic fields 12 may alter the electrical resistance of a conductor in circuit 20. Thus, changes in resistance may be correlated with the angles of magnetic fields 12. The angles of magnetic fields 12 experienced by circuit 20 may vary depending upon the rotational position of magnet 10. Therefore, resistance may be used to determine the rotational position of magnet 10. However, the electrical resistance may not be affected by the direction of magnetic fields 12. Therefore, 180 degrees of angles, or one-half of a magnet 10 revolution, may be measured, with each angle having a unique resistance. The unique resistance may be used as a unique signature for magnet 10 position. If the rotation of magnet 10 is limited to one-half revolution, then the position of magnet 10 may be known and, in turn, the position of magnet 10 may be used to identify the position of a valve actuator.

As illustrated in FIG. 2, a valve actuator 200 may incorporate magnetic angle sensor 100. Valve actuator 200 can include one or more rotatable members. Magnetic angle sensor 100 may be used in conjunction with any rotatable member. As drawn in FIG. 2, magnetic angle sensor 100 can be used with output shaft 270.

Valve actuator 200 may include any valve actuator known in the art. FIG. 2 illustrates a simplified exemplary valve actuator 200. FIG. 2 does not illustrate a complete valve actuator. Components such as housings, prime movers, controls, displays, and clutches are known in the art and, for ease of discussion, are not illustrated. Valve actuator 200 may be designed for manual, electrical, pneumatic, or hydraulic operation. Valve actuator 200 may include an input shaft 240. One end of input shaft 240 may be circumscribed by pinion 250. Pinion 250 may be configured to mate with gear 260. Gear 260, in turn, may circumscribe output shaft 270.

Input shaft 240 may be connected to any valve actuator drive mechanism known in the art. Input shaft 240 may include any valve actuator input means known in the art. Input shaft 240 may be designed for rotary or linear movement. For, example, input shaft 240 may be connected to a handwheel or to an electric motor. FIG. 2 illustrates a single input shaft 240; however, multiple input shafts 240 may be present. For example, when valve actuator 200 includes a clutch that allows either an electric motor or a handwheel to drive valve actuator 200, two input shafts 240 may be present. Input shaft 240 may be perpendicular to, parallel to, inline with, or the same shaft as output shaft 270. In an alternative embodiment, the output shaft may drive a single encoder shaft whether or not it's driven by the motor or by the handwheel.

Pinion 250 and gear 260 may include any type of gear arrangement known for valve actuators. Pinion 250 and gear 260 may include multiple gears, shafts, pulleys, belts, or any other means of transferring mechanical energy from input shaft 240 to output shaft 270. Pinion 250 and gear 260 are only one example of how mechanical energy may be transferred from input shall 240 to output shaft 270.

Output shaft 270 may include any valve actuator output means known in the art. Output shaft 270 may be designed for rotary or linear movement. Output shaft 270 may be designed to operate quarter-turn, single-turn multi-turn, or linear valves. By way of example only, output shaft 270 may include a solid shaft. The solid shaft may be designed to couple with the valve stem of a valve, such as a quarter-turn or single-turn valve. Rotation of output shaft 270 (and hence, the solid shaft) may then rotate the valve stem. In another example, output shaft 270 may include a drive sleeve or output drive assembly. Drive sleeves can be used with multi-turn valves. Drive sleeves may include the drive tube, bearings, worm gear and encoder bevel gear. The drive sleeve may also include a clutching mechanism. Quarter, single & multi-turn actuators may use a drive sleeve. The center of the drive sleeve may include an externally keyed, internally threaded stem nut or an externally/internally keyed torque nut. Either nut can accept a valve stem and apply force to it to move the valve. The drive sleeve may engage a valve stem nut designed to engage the threads of a valve stem. Rotation of output shat 270 (and hence, the drive sleeve and valve stem nut) may then raise or lower the threaded valve stem.

Magnet 10 may be attached to output shaft 270 by any means known in the art. Alternatively, circuit 20 may be attached to output shaft 270. The attachment of magnet 10 to output shaft 270 merely provides one example of how magnetic angle sensor 100 may be configured for use with output shaft 270. In yet another embodiment, as shown in FIG. 1B, multiple sensor chips may be axially aligned with a single magnet on a rotating shaft, with one sensor being mounted on the magnet side of the PCB 30, the other sensor being mounted on the far side of its PCB 30. In an alternate embodiment, a single circuit 20, holding two distinct arrays 25, 26 of Hall sensors, as shown in FIG. 1C, can be axially aligned with a single magnet 10 on a rotating shaft, with the circuit 20 being mounted on either side of its PCB 30. Any manner of configuring magnetic angle sensors known in the art may be used with the present invention.

The drawings do not illustrate any packaging of magnetic angle sensor 100. Magnetic angle sensor 100 lay be designed so that magnet 10 is incorporated within the same packaging as circuit 20. Alternatively, magnet 10 may be external to any packaging of circuit 20. Magnet 10 may be above or below circuit 20 (from the perspective where PCB 30 is below circuit 20). The magnet may be placed at the end of a shaft that is directly coupled to an output drive sleeve. The magnet may be bonded to the shall or it can be included in the circuit board assembly such that when the board is placed over the shaft, the magnet automatically latches with a key on the shaft. It is understood that no physical contact is required between the circuit board and the magnet.

Magnetic angle sensor 100 may include an off-the-shelf sensor or may include a custom-built sensor. Examples of a suitable magnetic angle sensor 100 for use with the invention include the Austriamicrosystems AS5045 and the Renishaw AM8192.

Magnetic angle sensor 100 may be used with valve actuator 200 to generate absolute position data for output shaft 270. Referring to the previously described Hall sensor embodiment, circuit 20 can identify the absolute position of magnet 10. Output shaft 270 may be limited to a single revolution or less, so that the rotational position of magnet 10 may be used to identify the rotational position of output shaft 270.

Magnetic angle sensor 100 may be used with valve actuator 200 to generate incremental position data and the angular velocity of output shaft 270. When circuit 20 experiences a change in either Hail voltage or resistivity) due to a change in magnet 10 position, then a counter in a computer memory may be incremented. Thus, output shaft 270 may rotate more than one revolution and magnetic angle sensor 100 may still track the rotational position of output shaft 270. The rate of changes in circuit 20 may also be tracked to determine the angular velocity of magnet 10 and, hence, the angular velocity of output shaft 270. Methods of generating incremental data from magnetic angle sensors are known in the art.

Figure 3:
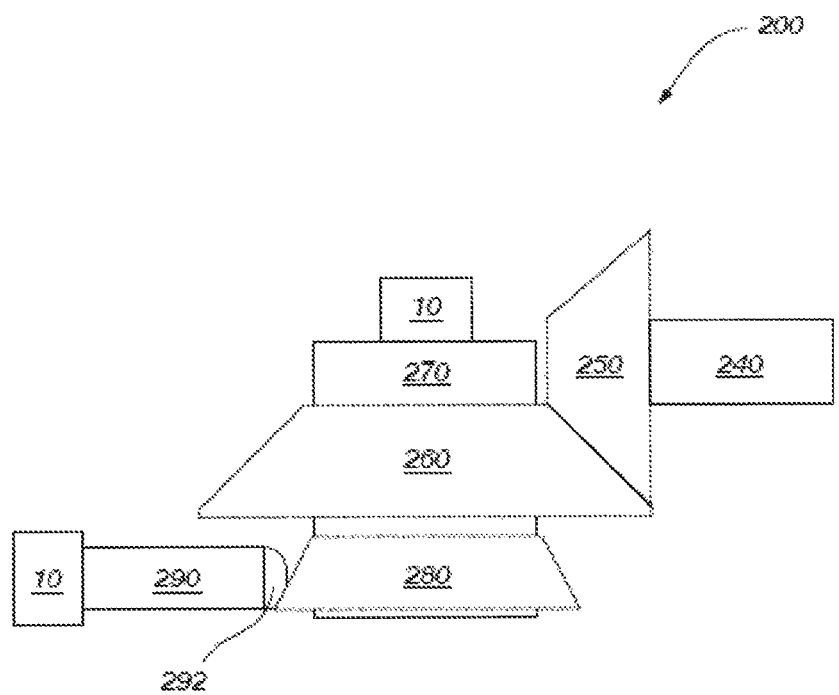
FIG. 3 illustrates an embodiment of a valve actuator including an embodiment of a magnetic angle sensor.

Magnet 10 may be attached to any rotatable member of valve actuator 200. For example, as illustrated in FIG. 3, auxiliary shaft 290 may rotate magnet 10 (the remaining portions of magnetic angle sensor 100 are not illustrated). Auxiliary shaft 290 may be driven by output shaft 270 may drive gear 280 and, in turn, gar 280 may drive pinion 292. Pinion 292 and gear 280 may include any type of gear arrangement known for valve actuators. Pinion 292 and gear 280 may include multiple gears, shafts, pulleys, belts, or any other means of transferring mechanical energy from output shaft 270 to auxiliary shaft 290. Auxiliary shaft 290, in conjunction with gear 280 and pinion 292, may be designed to reduce, increase, or maintain the rotational sped of output shaft 270. For example, auxiliary shaft 290 may be designed such that a single revolution of magnet 10 requires multiple rotations of output shaft 270. Any means known in the art for operating a rotary encoder may be used in translating movement of output shaft 270 into rotational movement of magnet 10. Gear 280, pinion 292, and auxiliary shaft 290 only represent one example of how mechanical energy may be transferred from output shaft 270 to magnet 10. Additionally, magnet 10 may also be attached to input shaft 240. Multiple magnetic angle sensors may also be utilized in valve actuator 200.

As noted above, valve actuator 200 may include any valve actuator known in the art. Valve actuator 200 may be part of any valve system known in the art. For example, valve actuator 200 may include a quarter-turn or single-turn rotary valve actuator. In these embodiments, magnetic angle sensor 100 may serve as an absolute position encoder. Magnetic angle sensor 100 may be less susceptible to damage, wear, and/or misalignment than a typical, optical disk-type single-turn encode. Additionally, magnetic angle sensor 100 may be able to provide fine position resolution. The fine resolution may be beneficial for quarter-turn and single-turn valve applications. Valve actuator 200 utilizing magnetic angle sensor 100 as an absolute position sensor, may also retain position data if power is lost to valve actuator 200. Upon repowering valve actuator 200, position data may be retrieved from magnetic angle sensor 100. Furthermore, in this exemplary embodiment, valve actuator 200 includes a magnetic angle sensor 100 that can have low power requirements, can be compact in size, and can be non-contacting.

Also, valve actuator 200 may include a multi-turn rotary-valve actuator. In this embodiment, use of magnetic angle sensor 100 may be particularly beneficial when the valve is a multi-port valve that may only turn in one direction (i.e., only clockwise ("CW") or counterclockwise ("CCW")). In this embodiment, one full revolution of output shaft 270 may result in one full revolution of the multi-port valve. The valve may be positioned at any port at any time, but may designed to take the shortest path, and should not pass thru unintended ports. In certain embodiments, an actuator may be called upon to continually move a valve in a single direction (always clockwise or always counterclockwise). In another embodiment, the actuator may move the valve in variable sequences, such as a two steps forward, on step reverser scenario (e.g., 1CW, 1CW, 1CCW, 1CW, 1CW, 1CCW) In a particular embodiment, magnet 10 position may be permanently associated with the position of output shaft 270 and, thus, with the multi-port valve position. Regardless of the number of revolutions of magnet 10, the position of magnet 10 may correspond to the position of the multi-port valve. Thus, in this embodiment, magnetic angle sensor 100 may serve as an absolute position encoder. Additionally, any alignment errors introduced during registration of the angular position of the magnetic field relative to the position of the actuator during field installation configuration may not accumulate during movement of the actuator or valve. Instead, any initial registration or configuration error may remain a fixed error and will not increase or accumulate as the valve or actuator moves through multiples of rotations.

Valve actuator 200 may also be used when a multi-port valve does not exceed one revolution (i.e., the order of ports opened alternates from A to B to C to B to A). In that embodiment, the accumulation of error may inherently not be of concern. Valve actuator 200 may also include a multi-turn rotary valve actuator that utilizes magnetic angle sensor 100 as an incremental position encoder which incrementally counts drive sleeve turns, but absolutely measures output drive angle with in any given rotation.

Valve actuator 200 may include a linear valve actuator. For example, output shaft 270 may be a linearly moving actuator stem. Gear 280 (FIG. 3) may be a linear rack mounted lengthwise along output shaft 270. Auxiliary shaft 290 may include a pinion that mates with the rack on output shaft 270. Thus, movement of a rack on output shaft 270 may rotate auxiliary shaft 290. Movement of magnet 10 may be used to track the position of output shaft 270.

Although this invention has been described with reference to particular embodiments, the invention is not limited to these described embodiments. Rather, the invention is limited only by the appended claims, which include within their scope all equivalent devices, methods, and systems that operate according to the principles of the invention as described.

What is claimed is:

1. A valve actuator, comprising:
   at least one rotatable member; and
   a magnetic angle sensor in communication with the at least one rotatable member, wherein the magnetic angle sensor comprises:
   a single magnet having an axis of rotation substantially about a midpoint of the single magnet and in axial alignment with an axis of rotation of the at least one rotatable member; and
   a sensor circuit holding two distinct arrays of Hall sensors, wherein the Hall sensors are radially arrayed, the sensor circuit is in alignment with the axis of rotation of the single magnet, and the sensor circuit is configured to be mounted on either side of a printed circuit board.

2. The valve actuator of claim 1, wherein the magnetic angle sensor is configured to generate absolute position data.

3. The valve actuator of claim 1, wherein the magnetic angle sensor is configured to generate incremental position data.

4. The valve actuator of claim 1, wherein the single magnet rotates with the at least one rotatable member.

5. The valve actuator of claim 1, wherein the sensor circuit comprises an array of magneto-resistive sensors.

6. The valve actuator of claim 1, wherein the at least one rotatable member is configured for less than or equal to one revolution.

7. The valve actuator of claim 1, wherein the at least one rotatable member is configured for multiple revolutions.

8. The valve actuator of claim 1, wherein the magnetic angle sensor further comprises a second sensor circuit, wherein the second sensor circuit is in alignment with the axis of rotation of the single magnet.

9. A method of determining valve actuator position, the method comprising:
   providing a magnetic angle sensor comprising:
      a single magnet having an axis of rotation substantially about a midpoint of the single magnet and in axial alignment with an axis of rotation of at least one rotatable member;
      a first sensor circuit attached to a first side of a printed circuit board, the first sensor circuit having an array of sensors; and
      a second sensor circuit attached to a second side of the printed circuit board, the second side of the printed circuit board located opposite the first side, wherein each of the first sensor circuit and the second sensor circuit is in alignment with the axis of rotation of the single magnet, and each of the first sensor circuit and the second sensor circuit sense the position of the single magnet;
   correlating an electrical output of the magnetic angle sensor installed in a valve actuator with a position of an output shaft of the valve actuator;
   energizing the magnetic angle sensor to generate electrical output from the magnetic angle sensor; and
   determining the position of the output shaft from the electrical output of the magnetic angle sensor.

10. The method according to claim 9, wherein determining the position of the valve actuator comprises determining absolute position of the output shaft.

11. The method according to claim 9, wherein determining the position of the valve actuator comprises determining incremental position of the output shaft.

12. The method according to claim 9, further comprising determining an angular velocity of the output shaft.

13. A valve actuator, comprising:
   at least one rotatable member; and
   a magnetic angle sensor in communication with the at least one rotatable member, wherein the magnetic angle sensor comprises:
      a single magnet having an axis of rotation substantially about a midpoint of the single magnet and in axial alignment with an axis of rotation of the at least one rotatable member; and
      a first sensor circuit attached to a first side of a printed circuit board, the first side of the printed circuit board facing the magnet; and
      a second sensor circuit attached to a second side of the printed circuit board, the second side of the printed circuit board facing away from the magnet, wherein each of the first sensor circuit and the second sensor circuit is in alignment with the axis of rotation of the single magnet, and each of the first sensor circuit and the second sensor circuit sense the position of the single magnet.

14. The valve actuator of claim 13, wherein one of the first sensor circuit and the second sensor circuit comprises one or more Hall sensors.

15. The valve actuator of claim 14, wherein the other of the first sensor circuit and the second sensor circuit comprises one or more magneto-resistive sensors.

* * * * *